June 6, 1961 H. WAGEMANN 2,987,246

DECIMAL POINT MECHANISM

Filed June 27, 1957 6 Sheets-Sheet 1

INVENTOR.
HEINRICH WAGEMANN

BY

ATTORNEY

June 6, 1961

H. WAGEMANN 2,987,246

DECIMAL POINT MECHANISM

Filed June 27, 1957

6 Sheets-Sheet 2

INVENTOR
HEINRICH WAGEMANN
BY George V. Hall
ATTORNEY

INVENTOR.
HEINRICH WAGEMANN

BY

George V. Hall
ATTORNEY

June 6, 1961 H. WAGEMANN 2,987,246

DECIMAL POINT MECHANISM

Filed June 27, 1957 6 Sheets-Sheet 4

INVENTOR
HEINRICH WAGEMANN
BY George V. Hall
ATTORNEY

June 6, 1961 H. WAGEMANN 2,987,246

DECIMAL POINT MECHANISM

Filed June 27, 1957 6 Sheets-Sheet 5

*INVENTOR.*
HEINRICH WAGEMANN

BY George V. Hall

ATTORNEY

June 6, 1961 H. WAGEMANN 2,987,246

DECIMAL POINT MECHANISM

Filed June 27, 1957

6 Sheets-Sheet 6

INVENTOR.
HEINRICH WAGEMANN

BY George V. Hall

ATTORNEY 2,987,246
Patented June 6, 1961

1

2,987,246

DECIMAL POINT MECHANISM

Heinrich Wagemann, West Orange, N.J., assignor to Monroe Calculating Machine Company, Orange, N.J., a corporation of Delaware Filed June 27, 1957, Ser. No. 668,416
7 Claims. (Cl. 235—60.15)

This invention relates to decimal point mechanism for calculating machines. More particularly, the invention relates to means automatically operable to locate and print the decimal point in a printing calculator.

It is the primary object of the invention to provide a printing calculator wherein the decimal point is automatically located and printed with respect to printed factors and products.

A more particular object of the invention is to provide mechanism for automatically locating and printing the decimal point for factors and products in a printing calculator embodying mechanism for automatically locating and printing the decimal point with respect to a printed quotient.

Another and specific object of the invention is to automatically locate a decimal point with respect to the digit type members of a printing calculator and then to print the decimal point in conjunction with a digit printing operation.

A further and more specific object of the invention is to combine decimal printing mechanism with conventional digit printing mechanism in a printing calculator, and to provide automatic means to control operation of the decimal printing mechanism in conjuntion with digit printing operations.

The invention is particularly adaptable for use in a ten-key type printing calculator in which type of machine a preferred embodiment of the invention is disclosed. In this machine, each factor of a problem of multiplication is set in a pin carriage upon successive depression of keys of the ten-key keyboard corresponding to the digits of the factor from higher to lower orders. Furthermore, a decimal key is depressed in proper sequence with the digit keys.

The multiplicand is set first and following the setting operation a multiplicand key is depressed. The setting operation conditions the decimal printing mechanism, and in response to depression of the multiplicand key, the multiplicand is entered into the machine and printed with the decimal point. The same setting sequence is followed for the multiplier with subsequent depression of a multiplier key. This again conditions the decimal printing mechanism, and the multiplier is entered and printed with the decimal point.

The setting of the factors is complementally operable to condition the printing mechanism for printing the decimal point of the product which is subsequently registered in an accumulator register. A total taking operation for this register will print the accumulated product and the decimal point.

The digit type members of the printing mechanism are adjusted from normal zero position in accordance with the initial strokes respectively of operating racks and then the printing mechanism is operated. After the printing operation the racks, in their return strokes, restore the type members to normal zero position. The excursions of the operating racks are controlled by a pin carriage, or in total taking operations are controlled in accordance with values registered in either the accumulator register to print a product or in a counter register to print a quotient with the decimal point. The present invention, however, does not concern the total taking operation to print a quotient which operation is fully disclosed in applicant's co-pending application #542,967 filed on October 26, 1955, now Patent No. 2,917,232.

2

It is old and well-known in the prior art to provide function control keys each operable to initiate a machine cycle wherein operating racks for type members are controlled in their excursions in accordance with pin carriage settings in a value entering operation, or in accordance with zeroizing movement of the numeral wheels in a selective one of several registers in a total taking operation. A complete understanding of the operation of the devices of the invention therefore will necessitate, with respect to these operations, only a description of the ordinal relationship of the pin rows of the pin carriage and of the numeral wheels with respect to the racks which control the digital adjustments of the type members. Furthermore, it will be understood that the program of multiplication is performed in well-known manner, and concerns the operation of the devices of the invention only in the provision to register the product in given orders of the accumulator register as determined by the initial ordinal operating positions of the registering mechanisms with respect to the register numeral wheels. The invention, however, will best be understood from the following description with reference to the accompanying drawings in which:

*General description*

Figure 1:
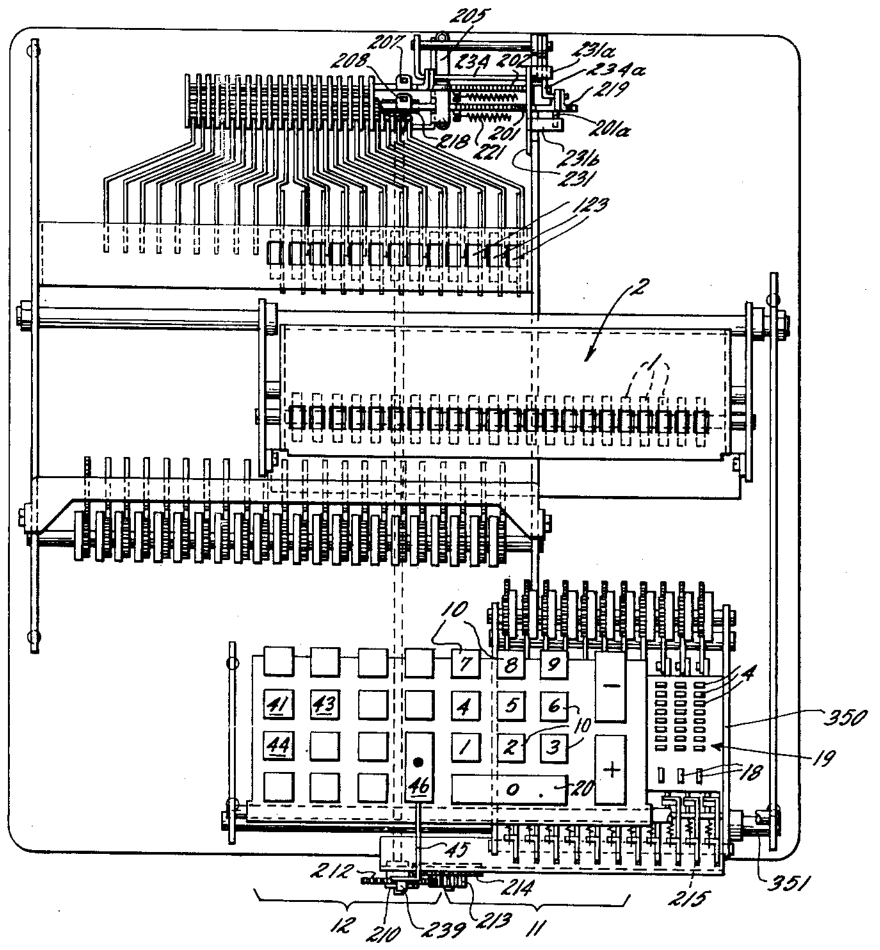
FIG.1 is a plan view of the calculating machine embodying the invention.

The particular type of ten-key calculating machine in which the invention is disclosed is more fully disclosed in applicant's co-pending application Serial No. 446,371 filed on July 28, 1954 and now abandoned. In this machine, an ordinal series of twenty-two racks 3 (FIG. 2) are reciprocably operable to adjust a respective digital type wheel 301 (FIGS. 2, 5, 6, 7) of a printing unit as later described.

A pin carriage 19 (FIGS. 3, 4) comprises eleven ordinal rows of pins 4. Pin carriage 19 is normally positioned, in the usual manner, to the right of the lowest order rack 3 and is adapted to be step shifted toward the left to bring depressed pins of the eleven rows successively from higher to lower orders into controlling position with respect to the eleven lowest order racks 3 (FIG. 2) from lower to higher orders. The depressed pins 4 of the key rows act as stops, in the usual manner, for forward extensions (not shown) of the eleven lowest order racks 3. Accordingly, in each cycle of operation, the forward excursions of racks 3 under control of the pin carriage is determined in accordance with depressed pins 4. During the forward excursions of racks 3, type wheels 301 are rotated to the values corresponding to the respective pin carriage settings. Then the printing operation is performed and the type wheels are restored during the return strokes of the racks.

The above operations with respect to control of the printing mechanism are all conventional and well known in listing machines. In this machine, however, the reciprocatory operation of racks 3 under control of pin carriage 19 in a printing operation is not simultaneously adapted to perform a registering operation as is usual in listing machines. Instead, what may be termed a pre-registering operation is performed upon reciprocation of racks 3 under control of the pin carriage. This operation comprises the setting of differentially settable rotary digital actuator units 5 (FIG. 2) for the accumulator register comprising an ordinal series of numeral wheels 1 (later described).

There are eleven rotary digital actuator units 5 and associated tens transfer mechanism. Each of the digital actuator units is adapted, through a setting train (not shown), to be set upon reciprocatory operation of a respective rack 3 in accordance with the digital value corresponding to the setting of the associated type wheel 301 by said rack.

After the setting operation, the rotary actuating means may be cycled one or a plurality of times. Consequently, high speed rotary registering operation is achieved in conjunction with listing in the usual manner. This principle of listing in conjunction with setting of rotary actuating mechanism is broadly disclosed in Patent #1,467,198. However, the setting of the rotary digital actuators 5 and the control of their registering operations does not concern the decimal devices of the present invention only in the provision to effect registration of a product in particular orders of the accumulator register. Thus a total taking operation from the accumulator register will control the excursions of racks 3 ot control printing in the appropriate orders with respect to a predetermined decimal location as will appear later.

The ordinal series of numeral wheels 1 (FIGS. 1, 2) comprising the accumulator register, is mounted in a transversely shiftable carriage 2 above digital actuators 5. There are twenty-two accumulator wheels 1. That is, a wheel 1 corresponding ordinally to each of the twenty-two type wheels 301 and racks 3.

Figure 3:
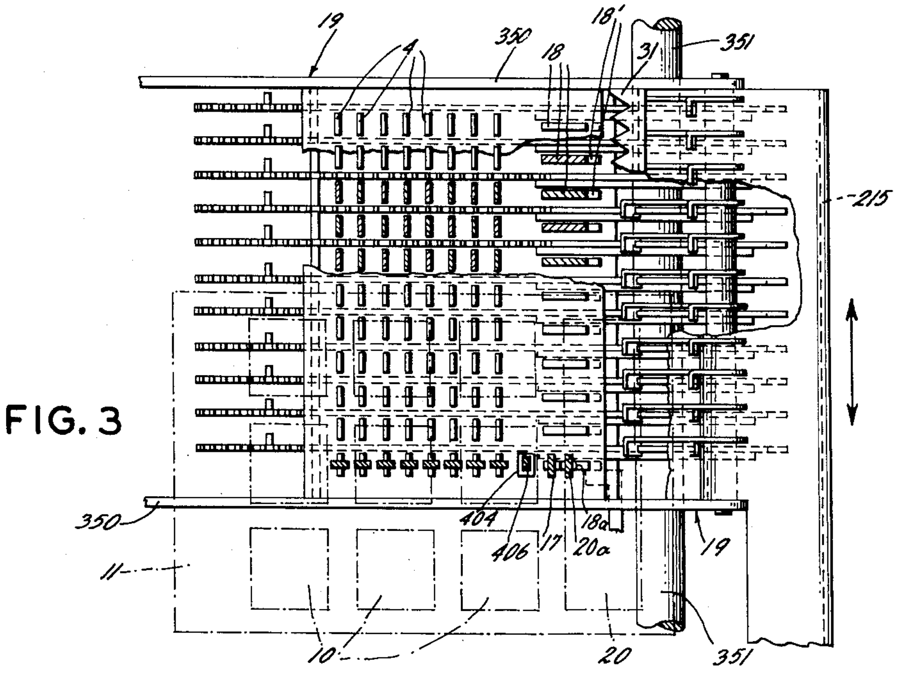
FIG. 3 is a detail plan view of the key stems and the pin carriage.

When carriage 2 is in its rightmost position (FIG. 1), the eleven highest order wheels 1 are positioned for registering operation by the eleven rotary actuators 5 which are settable upon operation of the eleven lowest order racks 3 under control of pin carriage 19 (FIG. 3, 4). As carriage 2 is ordinally shifted to the left, the eleven lower order wheels 1 are successively moved into registering position with respect to actuators 5 as the higher order wheels are moved successively out of registering position. When carriage 2 has been shifted to its leftmost position, the eleven lowest order wheels 1 will be in registering position with respect to actuators 5.

Figures 9, 10, 11:
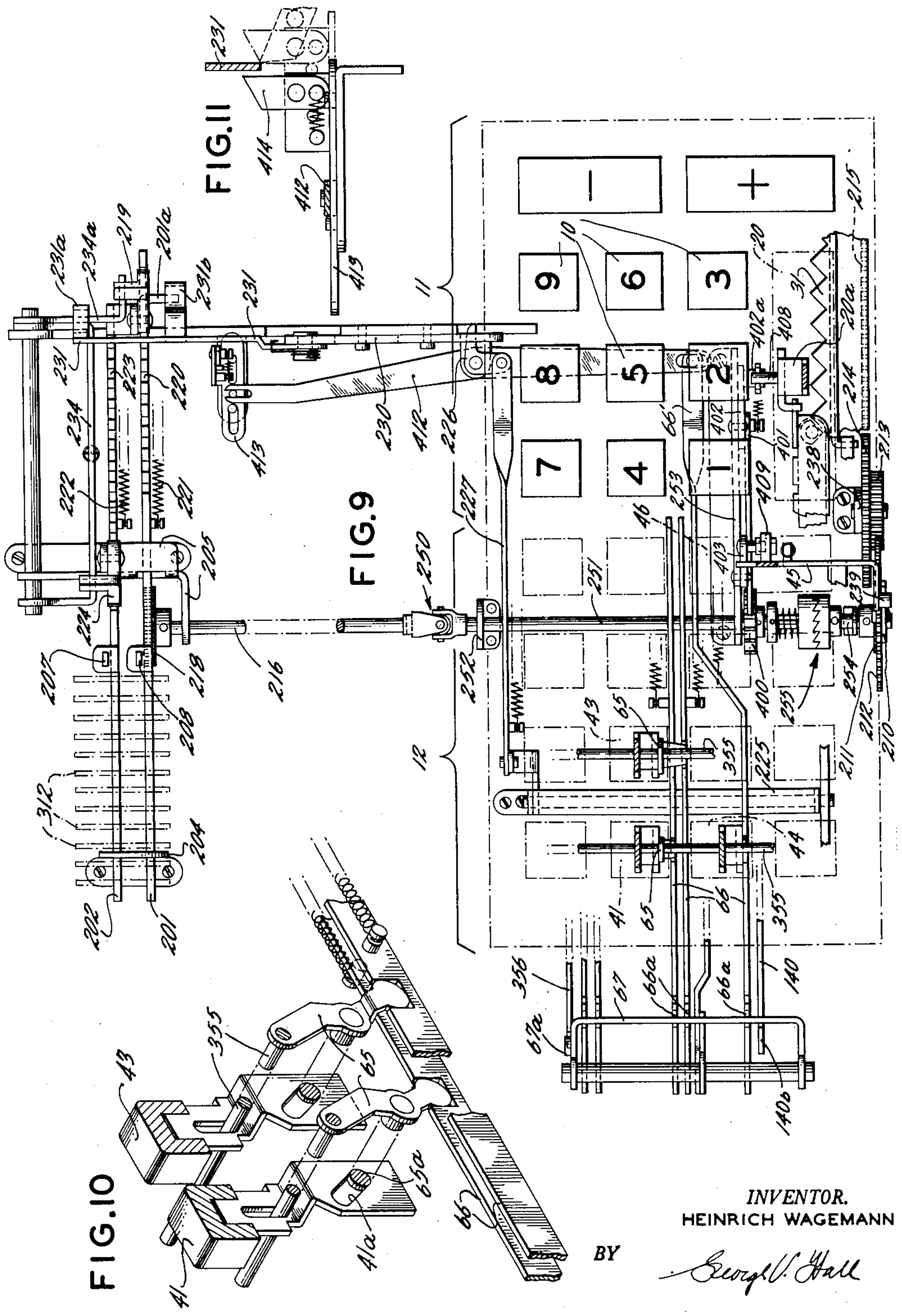
FIG. 9 is a plan view of mechanism of FIG. 8.
FIG. 10 is a fragmentary perspective of the multiplicand and multiplier entering key and associated mechanism.
FIG. 11 is a detail of normalizing means operable in a total taking operation.

Carriage 2, in its leftmost position, will locate the twenty-two accumulator wheels 1 in ordinal alignment with respect to the twenty-two type wheels 301 for a total taking operation which is initiated upon depression of one of the control keys of the left keyboard 12 (FIGS. 1, 9). In this position, a total taking operation for accumulator wheels 1 will control the excursions of the respective racks 3 to adjust the ordinally corresponding type wheels 301.

Figure 2:
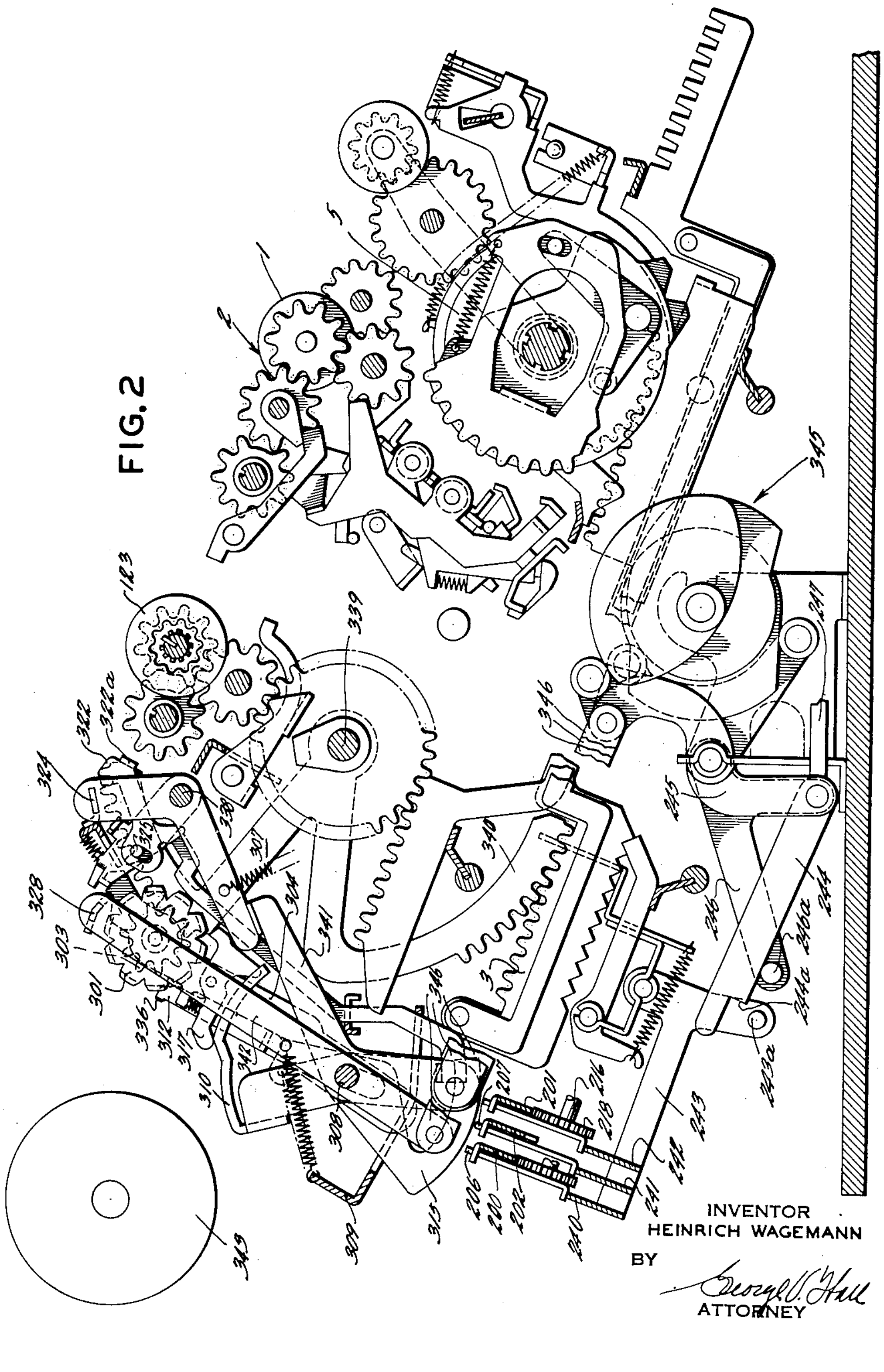
FIG. 2 is a left side elevation of the printing mechanism, the actuating racks therefor and the driving means.

A counter register comprises an ordinal series of numeral wheels 123 (FIGS. 1 ,2). A quotient is registered in this register and a decimal point located with respect thereto. A total taking operation from counter wheels 123 will control the excursions of the respective racks 3 to adjust the ordinally corresponding type wheels 301 for a quotient and decimal printing operation. This operation is fully disclosed in the afore-noted co-pending application #542,967.

*Pin carriage control*

Pin carriage 19 (FIGS. 3, 4) is spring biased toward the left, in the usual manner, and is normally restrained in rightmost shifted position by an escapement mechanism. The escapement mechanism is adapted to be operated upon depression of 1–9 digit keys 10 and a zero key 20 of a ten-key keyboard 11 (FIGS. 1, 3) to enter the corresponding values in a row of pins 4 and to step shift carriage 19 one ordinal position to the left.

Upon cyclic operation of the machine, carriage 19 is restored to its normal right end position after performing its control functions. The above operations are well-known conventional control operations in ten-key type calculating machines. There is, however, a control operation in connection with the escapement mechanism, upon depression of zero key 20, which is essential to the operation of the decimal location devices for the quotient as disclosed in the aforenoted application #542,967. The present invention is disclosed as incorporated in a machine embodying these quotient decimal devices, and this necessitates another control operation in response to depression of zero key 20 which is only necessary, as will appear, because of the first noted control operation.

The escapement mechanism for pin carriage 19 (FIGS. 3, 4, 8) comprises an ordinal series of vertically adjustable stop slides 18 located in the carriage at the front of the respective rows of pins 4. Slides 18 are normally held in raised position by suitable detent means thereby locating a lug 18', at the lower end of each, in the horizontal plane of a fixed stop comprising a pin 7.

Figure 4:
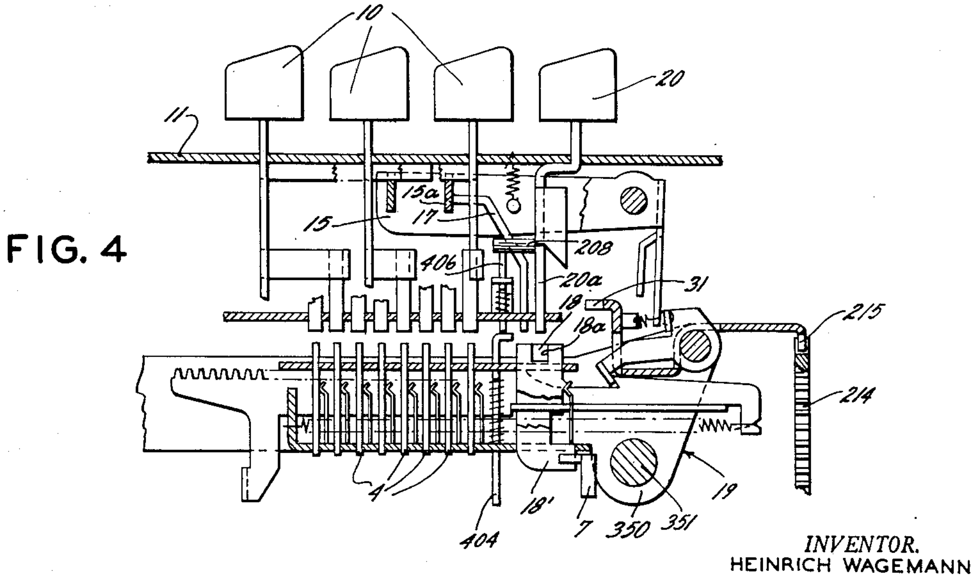
FIG. 4 is a side elevation with parts in section of the ten-key keyboard and the pin carriage.

When carriage 19 is in its normal rightmost position, lug 18' of the leftmost slide 18 will engage the fixed stop pin 7, as shown in FIGS. 3, 4, thereby restraining said carriage from left shift movement. This slide will then be in position for depression under control of the ten-key keyboard 11. Depression of this slide 18 will move lug 18' from engagement with pin 7. Thereupon, carriage 19 will be released and will be shifted one ordinal position to the left where it will be arrested by engagement of lug 18' of the next lower order slide 18 with stop pin 7. This slide will now be in position for depression under control of the ten-key keyboard. Thus slides 18 are adapted to be depressed successively from higher to lower orders to bring the respective rows of pins 4 in controlling position with respect to the successive higher order racks 3.

When pin carriage 19 in its normal right end position, depression of any one of the digit keys 10 will set the corresponding pin 4 of the highest order pin row and will simultaneously depress the associated escapement slide 18. Pin carriage 19, therefore, will be shifted one ordinal position to the left to position the next lower order pin row and escapement slide 18 for setting operation upon the next key depression. However, depression of zero key 20, when carriage 19 is in rightmost position, will be ineffective to depress the highest order slide 18 and the carriage will not be shifted from home position. After carriage 19 has been shifted from home position in response to depression of a digit key 10, depression of either a digit key 10 or zero key 20 will be effective to depress the associated escapement slide 18. The above shift control of pin carriage 19 by digit keys 10 and zero key 20 is essential in the operation of the decimal location means for the quotient as disclosed in the aforenoted application Serial #542,967. The shift control of the pin carriage is effected as follows.

The highest order escapement slide 18 incorporates means for rendering depression of zero key 20 ineffective to depress said slide. Such means comprises a recess **18*a* (FIGS. 4, 8) in the top edge of the slide. The lower end 20*a* of the stem of zero key 20 is positioned immediately above recess 18*a* when pin carriage 19 is in its right end position. Consequently, upon depression of zero key 20, the lower end of its stem 20*a* will enter recess 18a without depressing slide 18 to release carriage 19**.

Means for shifting carriage 19 (FIGS. 3, 4) upon depression of a 1–9 digit key 10 comprises a plunger 17 common to all of the keys. Plunger 17 is secured at its upper end on the cross member 15a of a bail 15 and extends downwardly to the rear of stem 20a of zero key 20. Thus when pin carriage 19 is in rightmost position, the end of plunger 17 is immediately above the highest order slide 18 to the rear of recess 18a.

Bail 15 is located beneath the key plate of the ten-key keyboard 11 (FIG. 7) and is normally spring biased to the clockwise portion of FIG. 3. The stem of each of the 1–9 digit keys 10 has an appropriate shoulder or extension adapted, upon depression of the key, to rock bail 15 counterclockwise. Plunger 17, therefore, will engage the highest order slide 18 to the rear of recess 18a and carriage 19 will be shifted one order from its home position. Thereafter, either plunger 17 or stem 20a will be effective, upon depression, to engage the associated escapement slide 18 to release carriage 19.

After a value has been entered in pin carriage 19, racks 3, within the control range of said carriage, will be controlled in initial excursions by the settings of pins 4 during the first half of a machine cycle to adjust type wheels 301. During the second half of the cycle, the racks will be restored and pin carriage 19 will be shifted to normal right end position. The above operations are performed in the usual manner well known in the listing machine art.

*The printing mechanism (digit printing)*

The digit printing mechanism (FIGS. 2, 5, 6, 7), except for design details adapting it for concomitant decimal printing, and its mode and principle of operation is well known in listing calculating machines. The operation of the various parts in proper timed relation is controlled by the usual cam cluster 345 through link connections 346 with the parts.

Each digit type wheel 301 of the printing mechanism has a reduced hub portion 306 (FIG. 7) by which it is rotatably mounted at the upper left side of a hammer plate 304. Hub 306 extends through hammer 304 and, at the right side of the hammer, is fixed to a drive pinion 303 by the riveted end 305. Hammers 304 are rockably mounted adjacent their lower ends on a common shaft 308 and are each spring biased counterclockwise by a spring 337. Combs 309 and 310 serve to hold hammers 304 in spaced relation and to guide them in printing operation.

Each hammer is normally held clockwise against the bias of its spring 337 by a trigger 326. Triggers 326 are pivotally mounted forwardly of the upper ends of hammers 304 on a shaft 338 and are normally spring held counterclockwise each to engage a lug 331 at its rear end with a shoulder 332 at the upper end of a respective hammer 304. Upon clockwise movement of a trigger 326, lug 331 thereof will be moved above shoulder 332 thereby releasing the associated hammer. Lug 331 of each trigger 326 extends toward the right of the machine and underlies a nose 335 of the next lower order trigger. Therefore all lower order triggers are released in the usual manner in a printing operation.

Means for releasing each trigger 326 comprises a pawl 322 adjustably associated therewith. Pawl 322 is provided with a slot through which extends a pin 325 on one side of the trigger. Pawl 322 extends forwardly and above trigger 326 and at its forward end has spring connection 323 with a lug at the upper edge of trigger 325 intermediate its ends. Pawl 322, therefore, will normally be held downwardly (FIGS. 2, 5) with the upper end of slot 327 engaged with pin 325 and will be biased toward counterclockwise movement about said pin.

When the machine is in normal full cycle position, pawls 322 are held rocked clockwise against the bias of springs 323 (FIGS. 2, 5) by segmental actuator racks 307 which respectively engage drive pinions 303 of type wheels 301. Racks 307 are pivotally mounted on a shaft 339 and are integral with segmental racks 340 which are engaged respectively with racks 3. Thus when racks 3 are in normal rearward position, racks 340 and 307 will be rocked clockwise. The front end of each rack 307 terminates in a beveled edge 321 which engages the rear of a lug 322a at the front of the associated pawl 322.

Therefore with racks 307 in normal clockwise position, pawls 322 will be held clockwise about pins 325 against the bias of springs 323.

An operating bail 324 is pivotally mounted on shaft 338 and extends transversely above pawls 322. Bail 324 is normally spring held counterclockwise and is adapted to be rockedd clockwise upon each cycle of operation of the machine by a lever 341 which engages an extension 324a of said bail. With pawls 322 in normal clockwise position, a shoulder 322b at the upper front edge of each pawl will be below and out of the path of movement of bail 324.

A restore bail 328 extends transversely and to the rear of the upper ends of hammers 304. Bail 328 is mounted at the upper ends of a pair of levers 342 which are pivotally mounted on shaft 308 and are positioned at the opposite sides of the series of hammers 304. Bail 328 normally is in clockwise position and engages a shoulder adjacent the rear upper edge of each hammer 304. During each cycle of the machine, bail 328 is adapted to be rocked counterclockwise to permit hammers 304 to be fired.

Figures 5, 6, 7:
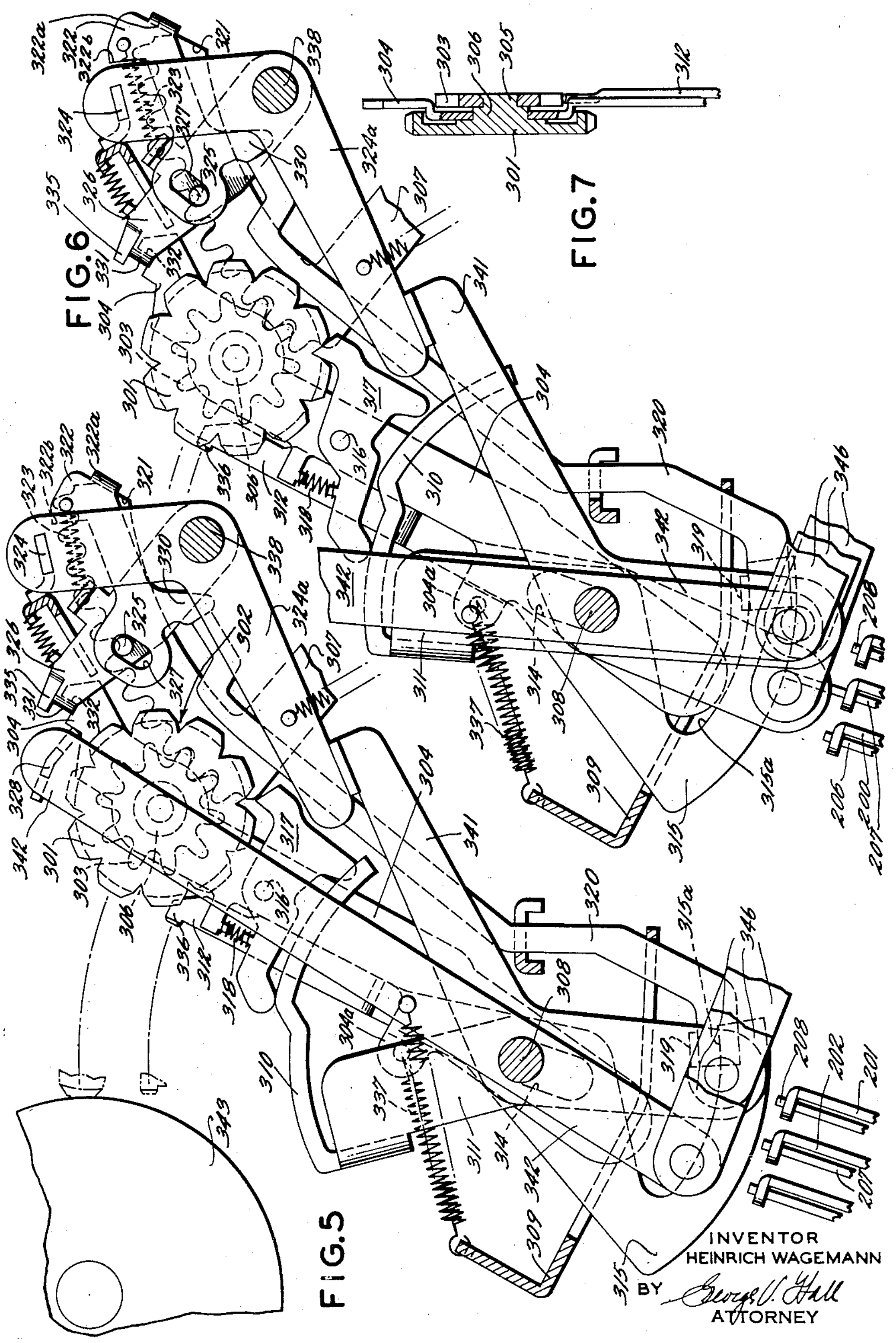
FIG. 5 is an enlarged right side elevation of the printing mechanism in normal position.
FIG. 6 is a view similar to FIG. 5 with the parts in an operated position.
FIG. 7 is a sectional view of a digit printing wheel unit and the associated decimal printing member.

A normally disengaged detent 317 is adapted to align each type wheel 301 prior to release of hammers 304 in a printing operation. Detent 317 is pivotally mounted at 316 on hammer 304 of the associated type wheel 301. Normally detent 317 is held in clockwise disengaged position against the bias of a spring 318 by engagement of its rearwardly extending end with the uppermost surface of the stepped arcuate face of comb 310. Comb 310 is supported at its ends by a pair of levers 311 which have pivotal mounting on shaft 308. During a machine cycle, levers 311 and comb 310 are rocked clockwise as shown in FIG. 6. This will move the step of comb 310 to the front of the rear end of detent 317 which will then be rocked counterclockwise by spring 318 to engage an aligning recess 302 in the periphery of type wheel 301.

During the first half of a printing cycle, racks 3 (FIG. 2) will move in forward excursion thereby rocking segmental racks 307 and 340 counterclockwise to rotate type wheels 301. The extent of the excursions of racks 3 may be controlled by settings of pins 4 in carriage 19 (FIGS. 3, 4), or they may be controlled in a total taking operation from accumulator wheels 1 or from counter wheels 123.

The counter register is non-shiftable and counter wheels 123 therefore are fixed in correct ordinal relationship with respect to the printing mechanism. However when a total is to be taken from the accumulator register, carriage 2 is shifted to its left end position to locate accumulator wheels 1 in ordinally correct position. Type wheels 301 therefore will be rotated to the digital values corresponding to the settings of pin carriage 19 or to the digital values corresponding to the registration of counter wheels 123 or accumulator wheels 1. The present invention, however, is not concerned with printing operations in connection with total taking operations from the counter register, but with printing operations in connection with the entry of factors and with total taking operations from the accumulator register to print the products.

Upon counterclockwise movement of racks 307 and 340, beveled edges 321 of racks 307 will be moved from engagement with lugs 322a of the associated pawls 322. These pawls will therefore be released and will be rocked counterclockwise about pins 325 by springs 323 from the position of FIG. 6. This will position shoulders 322b thereof in the path of operating bail 324. Also during the first half of the cycle, levers 342 and restore bail 328 supported thereby will be rocked counterclockwise so that type hammers 304 may be released for counterclockwise printing operation.

Actuator racks 3 (FIG. 2) will dwell after the above adjustments have been made and during this time the printing operation will be effected. First, however, comb 310 will be rocked from the position of FIG. 5 to the position of FIG. 6. This will permit counterclockwise movement of detents 317 to engage recesses 302 thereby aligning wheels 301 for the printing operation. After this, bail 324 will be rocked clockwise and will therefore engage shoulders **322*b* which are in its path of movement. Consequently pawls 322, whose shoulders 322*b* are engaged, will be rocked clockwise. Clockwise movement of pawls 322 will first move the top of slots 327 from engagement with pins 325 and engage the bottoms of the slots therewith. Then upon further clockwise movement of pawls 322, the associated triggers 326 will be rocked clockwise thereby releasing the respective hammers 304. Also any lower order hammer which is not released by its pawl 322 will be released by lug 331 of the next higher order hammer engaging its nose 335**.

Upon release of hammers 304, they will be operated counterclockwise by springs 337 to effect the printing operation of type wheels 301 as shown by the dot-dash position of FIG. 6. After the printing operation, racks 3 (FIG. 2) will be restored to the rear as the machine completes the cycle and during this time the printing mechanism will be restored to normal position.

*The printing mechanism (decimal printing)*

A normally disabled decimal type member 336 (FIGS. 2, 5, 6, 7) is simultaneously operable with each digit type wheel 301, except the lowest order wheel to print a decimal to the right of the printed digit. Decimal type member 336 is carried at the upper end of a slide 312 which has an arcuate lower end 315 and a longitudinal slot 314 through which passes shaft 308. Normally slide 312 is in lowered position (FIGS. 2, 5) with the upper end of slot 314 engaging shaft 308.

Each slide 312 extends upwardly at the right side of hammer 304 of the associated type wheel 301, and toward the rear from its lower end 315 to a distance above shaft 308. Above shaft 308, slide 312 is stepped to the left (FIG. 7) and extends upwardly in engagement with the back of hammer 304. Consequently when hammer 304 is rocked counterclockwise in operating movement, decimal slide 312 will be operated therewith. With slide 312 in normal lower position (FIG. 5), decimal type 336 will travel in the lower dot-dash path below the printing line of the digit type and will not operatively engage platen 343. However when slide 312 is raised to the position of FIG. 6 as later described, decimal type 336 will be brought to printing line position and will be effectively operated with digit type wheel 301.

An ear **304*a* at the rear of hammer 304 and to which spring 337 is fastened, is stepped to the right to form a shoulder which engages the rear of decimal slide 312. Therefore when hammer 304 is restored clockwise, ear 304*a* will operate to restore slide 312**.

From the above, it will be seen that a decimal type 336 is not independently operable but is operated by hammers 304 of the associated type wheels 301. Therefore means is operable upon raising of each decimal type 336 to printing line position to condition the mechanism for operation of the associated type wheel 301. If such means were not provided, the decimal would not be printed in instances where there is no significant digit to the left of a decimal. Furthermore if there were zeros between the decimal and the first significant decimal digit neither the decimal point nor the zeros would be printed.

The conditioning means operable upon raising of each decimal type member 336 comprises a slide 320 guided by suitable combs at the rear of hammers 304 of the decimal type member. A lug 319 at the lower end of slide 320 overlies a shoulder **315*a* at the rear of arcuate end 315 of decimal slide 312, and the upper end of slide 320 engages the underside of a nose 330 of release pawl 322 for trigger 326 of hammer 304**.

When a decimal slide 312 is raised, as shown in FIG. 6, shoulder **315*a* will engage lug 319 and raise slide 320. As slide 320 is raised, slot 327 will permit pawl 322 to be raised. This will bring shoulder 322*b* of the pawl into the path of operating bail 324. Therefore, hammer 304 will be fired and the decimal will be printed regardless of the operation of rack 307 to release said pawl. After the printing operation, slides 312 and 320** will be restored by gravity.

A plunger 206, 207 or 208 (FIGS. 2, 5, 6, 8, 9) may be operated to raise decimal slides 312 to effective operating position. Plungers 206, 207, and 208 are vertically mounted in suitable brackets on racks 200, 202 and 201 respectively which is transversely adjustable below arcuate ends 315 of the decimal slides.

Plunger 206 is operable to raise a decimal slide 312 for a quotient decimal printing. Rack 200 is adjustable to locate plunger 206 with respect to decimal slides 312. The present invention is not concerned with this operation which is fully described in applicant's aforenoted application #542,967.

Plunger 208 is operable to raise a decimal slide 312 for a factor printing operation, i.e., multiplicand, multiplier, dividend or divisor. When rack 201 is in normal transversely adjusted position, plunger 208 is located immediately to the right (FIG. 8) of the vertical plane of the lowest order type wheel 301. There is no decimal mechanism associated with the lowest order printing mechanism; therefore raising of plunger 208 in this normal position would be an idle operation. However, as later described, rack 201 is ordinally stepped to the left in each factor entering operation, to locate plunger 208 below the successive higher order ends 315 of decimal slides 312.

Plunger 207 is operable to raise a decimal slide 312 for a total taking operation of wheels 1 of the accumulator register to print a product. In a total taking operation of the accumulator register, carriage 2 is shifted to its left end position to ordinally associate the twenty-two wheels 1 with the corresponding ordinal printing units. When rack 202 is in normal transversely adjusted position (FIG. 8) plunger 207 is located in the same vertical plane as plunger 208 and therefore will also be idly operated in this position. As later described, rack 202 is ordinally stepped to the left, in entry of a multiplicand and then further stepped upon entry of a multiplier, to locate plunger 207 for a product total taking operation.

After a plunger 207 or 208 has been automatically positioned by the devices of the invention, later described, the positioned plunger will be raised by a respective bail 241 or 242 (FIG. 2) which is operable to raise the plunger in any transversely adjusted position. Bails 241 and 242 which are respectively operable to raise plungers 207 and 208 are each operable by a train (not shown) which is identical to the operating train for bail 240 shown in FIG. 2 which raises plunger 206. This train operates as follows.

Bail 240, as shown in FIG. 2, is operated by a crank 243. Crank 243 is rocked by a hit or miss device comprising a rearwardly extending arm 244 pivotally mounted at its front on the depending arm of a crank 245 which is rocked during each machine cycle by a cam of cluster 345. A crank 246 has a rearwardly extending arm at the end of which a pin **246*a* engages the underside of arm 244. Normally an operating link 247 holds crank 246 clockwise with pin 246*a* holding arm 244** in the raised position of FIG. 2. Consequently upon each printing cycle, arm 244 and a shoulder 244a at the rear of said arm will pass idly above a pin 243a of crank 243.

Link 247 for rocking crank 246 may be operated in forward movement to enable interponent arm 244 by direct connection to one of the control keys generally indicated on keyboard 12 (FIG. 1) and which initiates a total taking operation for counter wheel 123 in which a quotient is registered. Optionally, however, link 247 could be operated by an individual key or lever which would be manually set before the total taking operation.

Upon forward movement of link 247, a crank 246 will be rocked counterclockwise thereby lowering arm 244. Consequently when arm 244 is moved to the rear during the subsequent total taking operation, shoulder 244a will engage pin 243a and rock crank 243 clockwise to raise plunger 206. This operation will occur during the first half of the cycle and will be completed before the printing operation. During the last half of the cycle the parts will be restored in the usual manner.

The link 247 for enabling the train for bail 241 may be operated upon depression of any one of the factor entering keys, i.e., dividend key 13, divisior key 14, multiplicand key 41 or multiplier key 43. Optionally, however, it could be operated by an individual key or lever which would be manually set before depression of the factor entering key.

Link 247 for enabling the train for bail 242 may be operated upon depression of key 44 of keyboard 12 (FIG. 1) which initiates a total taking operation for accumulator wheels 1 in which the product is registered. Optionally, however, it could be operated by an individual key or lever which would be manually set before the total taking operation.

*General description of operations in decimal location and printing for factors and for products*

In preparation for a program of multiplication, the multiplicand is entered in pin carriage 19 (FIGS. 3, 4) upon successive depression of digit keys 10 and zero key 20 of keyboard 11 (FIG. 1) corresponding to the digits of the multiplicand from higher to lower orders. If there is a decimal in the dividend, a decimal key 46 is depressed in proper sequence.

After entry of the multiplicand in pin carriage 19, a multiplicand entering key 41 will be depressed. In response to depresson of multiplicand entering key 41, racks 3 (FIG. 2) will be operated under control of pin carriage 19, as described, and the multiplicand and decimal will be printed by the lowest orders of the printing mechanism. Furthermore, during the above operation, the multiplicand will be entered in the lowest orders of rotary digital actuators 5. This operation, however, concerns the invention only in the provision to register the product in correct ordinal relation to the decimal printing mechanism which will be automatically adjusted as later described.

After the above multiplicand entering and printing operation, the multiplier is entered in pin carriage 19 with decimal key 46 depressed in proper sequence and then multiplier key 43 is depressed. In response to depression of multiplier entering key 43, racks 3 will be operated under control of pin carriage 19, and the multiplier and decimal will be printed by the lowest orders of the printing mechanism. Furthermore, during the above operation of racks 3, the multiplier will be entered into storage devices (not shown) by suitable trains operated by the racks.

The initiation of operation of rotary actuators 5 in the performance of product registration may be automatically effected subsequent to entry of the multiplier or optionally it may be effected in response to depression of one of the control keys of keyboard 12 (FIG. 1). The product registration is initiated with carriage 2 in leftmost shifted position and the multiplier digits are counted out from lower to higher orders with one ordinal shift of carriage 2 to the right after each digit is counted out. The product, therefore, will be registered in the lowest order wheels of the accumulator register.

The factor entering operations, product registration and carriage shifting are old and well known and concern the present invention only in the provision to enter the factors and effect product registration so as to control the digit printing mechanism for printing in correct ordinal relation to the decimal printing mechanism which is adjusted by the devices of the invention.

*Adjusting the decimal mechanism for printing the multiplicand, the multiplier and the product*

Rack 201 (FIGS. 2, 5, 6, 8, 9) which carries plunger 208 is slidably mounted below ends 315 of decimal slides 312 in brackets 204 and 205. Normally rack 201 is held in rightmost position by a light spring 221. When rack 201 is in normal right end position, plunger 208 will be located immediately to the right of the lowest order type hamer 304 which order hammer does not have decimal type mechanism associated therewith.

A pinion 218 engages teeth at the lower edge of rack 201 and is fixed at the rear of a shaft 216 which extends forwardly and downwardly from the rear (FIG. 2). Shaft 216 is rotatably mounted adjacent pinion 218, in bracket 205, and is connected at its front to a universal joint 250 (FIG. 9). Universal 250 connects shaft 216 to the rear of a forwardly extending horizontal shaft 251 which is rotatably mounted below the keyboard in brackets 252 and 253. Shaft 251 is connected at its front to the rear of a forwardly extending horizontal shaft 254 by a ratchet clutch 255.

Clutch 255 (FIGS. 8, 9) comprises a drum 255a splined on shaft 251 and an opposed drum 255b fixed on shaft 254. Drum 255a is spring urged axially on shaft 251 to engage a circumference of saw teeth with an opposed circumference of saw teeth on drum 255b. The teeth of clutch 255 are so inclined that counterclockwise rotation of shaft 254 will likewise rotate shaft 251; whereas independent counterclockwise rotation of shaft 251 is permitted by axial yield of clutch drum 255a as shaft 254 is held against rotation.

Shaft 254 has suitable bracket mounting intermediate its ends and has a pinion 211 fixed at its forward end. An upwardly extending arm 210 is pivotally mounted at its lower end on shaft 254 adjacent the front face of pinion 211, and a spur gear 212, rotatably mounted intermediate said arm engages pinion 211.

A pinion 213 integral with a spur gear 214 is rotatably mounted as a unit on a bracket 238 to the right of gears 211, 212. Gear 214 engages a front rack 215 which is integral with a rear rack 31. Racks 31 and 215 have bracket mounting 350 (FIG. 3) which supports pin carriage 19 at its front and is slidably mounted on cross shaft 351. Racks 31, 215 therefore are shifted as a unit with pin carriage 19 and thereupon rack 215 will drive gears 213, 214.

Arm 210 is adapted to be rocked to engage and disengage gear 212 with pinion 213. Normally however, arm 210 is held in the counterclockwise position of FIG. 8 with gear 212 disengaged from pinion 213 by a bell crank 410 having fixed mounting on the machine framing. Bell crank 410 has a forwardly extending arm which engages the right edge of arm 210 and an arm which extends to the right at the front of rack 31. Extending outwardly toward the front in a slot in the side wall of rack 31 is a leaf spring 411 which, when carriage 19 is in right home position, engages the right arm of crank 410. Crank 410 is therefore yieldably urged clockwise and arm 210 is yieldably held counterclockwise to disengage gear 212 from gear 213.

The upper free end of arm 210 (FIG. 8) comprises a cam edge 210a which is engaged by a roller 239 at the end of a forwardly extending arm of stem 45 of decimal key 46. Therefore, upon depression of key 46, roller 239, engaging cam edge 210*a*, will rock arm 210 clockwise against the yieldable urge of crank 410 and engage gear 212 with pinion 213. With gears 212, 213 engaged, each ordinal step of movement of pin carriage 19 to the left will be transmitted to rack 201 by the train comprising gear 218, shafts 216, 251, clutch 255, shaft 254, gears 211–214, and rack 215 which is shifted with the carriage.

A slide 140 (FIGS. 8, 9) latches decimal key 46 in depressed position. Slide 140 is spring urged toward the right with its right end 140*a* engaging the left side of key stem 45 of key 46 below a slot 45*a* in said key stem. Upon depression of key 46, slot 45*a* will be moved into registration with end 140*a* thereby permitting entry of said end to hold the key depressed.

The entry of a multiplicand, as noted before, includes depression of decimal key 46 in proper sequence. Therefore when pin carriage 19 is ordinally shifted to the left after depression of key 46, rack 201 will be likewise shifted thereby ordinally shifting plunger 208. Consequently, plunger 208 will be positioned below end 315 of the decimal slide 312 associated with the ordinal digit printing means which will be controlled by the corresponding setting of pin carriage 19. With the parts adjusted, as described above, the printing mechanism will be operated in response to depression of multiplicand key 41 to print the multiplicand. As an incident to the printing operation, plunger 208, will be raised, as previously described, so that the decimal will be printed in the correct ordinal position.

It will be recalled that pin carriage 19 is not shifted in response to depression of zero key 20 when said carriage is in right home position; and that this provision is necessary to the operation of the quotient decimal location devices of application No. 542,967. In the devices of the present invention, however, this necessitates provision to shift rack 201 in response to depression of zero key 20 independently of carriage 19 when said carriage is in home position. This is necessary when the factor comprises only decimal digits and one or more zeros immediately follow the decimal, e.g., (.05). If such provision were not made, the decimal would be located the same for the factor (.05) as for a factor (.5). Rack 201 is shifted upon depression of zero key 20, independently of carriage 19 as follows.

A ratchet wheel 400 is fast on shaft 251 adjacent the front face of bracket 253. A driving finger 401 has one end pivotally mounted on a depending arm of a crank 402 on bracket 253. Finger 401 extends toward the left from crank 402 and is supported intermediate its ends by pin and slot mounting on a horizontal arm of a crank 403 also on bracket 253. Normally crank 402 is spring held counterclockwise with finger 401 toward the right, and crank 403 is spring held counterclockwise thereby holding the operating left end of finger 401 raised above ratchet wheel 400.

A pair of freely retractable plungers 404 and 405 extend downwardly through pin carriage 19. When carriage 19 is in right home position (FIG. 8), the lower end of plunger 404 overlies a pin 402*a* of crank 402 whereas the lower end of plunger 405 overlies a pin 403*a* of crank 403.

A pair of freely retractable plungers 406, 407 are mounted in the key plate of the machine. When carriage 19 is in right home position, the lower end of plunger 406 overlies the upper end of plunger 404 whereas the lower end of plunger 407 overlies the upper end of plunger 405. Extending from the rear of the stem of zero key 20 is a pin 408 which overlies the upper end of plunger 406 and extending toward the right from stem 45 of decimal key 46 is a pin 409 which overlies the upper end of plunger 407.

Upon each depression of zero key 20, pin 408 will depress plunger 406 which, in turn, will depress plunger 404. Plunger 404 which engages pin 402*a* will rock crank 402 clockwise thereby moving finger 401 toward the left. If decimal key 46 is not in depressed position, the operating end of finger 401 will pass idly above ratchet wheel 400. However, when decimal key 46 is depressed, pin 409 will depress plunger 407 which in turn will depress plunger 405. Plunger 405 which engages pin 403*a* will rock crank 403 clockwise and the operating end of finger 401 will be lowered from the position of FIG. 8 to engage ratchet wheel 400. Therefore if zero key 20 is now depressed, with carriage 19 in home position, the leftward movement of finger 401 will engage its operating end with a tooth of ratchet wheel 400 thereby rotating shaft 251 a step of movement and accordingly step entrained rack 201. During this operation, clutch drum 255*a* will yield axially on shaft 251 and the train from clutch 255 to the pin carriage including clutch drum 255*b* will remain stationary.

Figure 8:
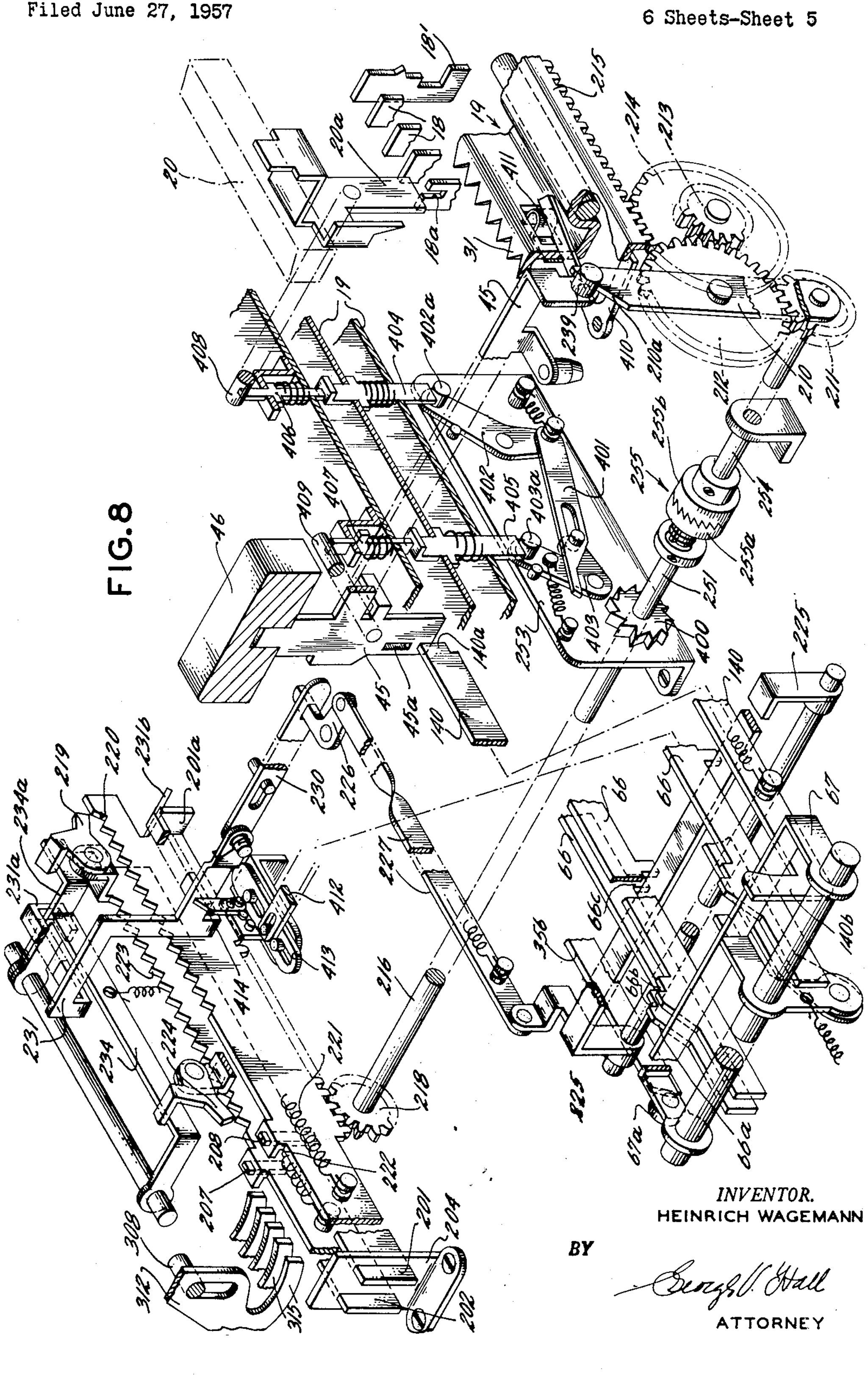
FIG. 8 is a fragmentary perspective of the mechanism controlled by the pin carriage for adjusting the decimal printing mechanism.

When carriage 19 is shifted from the home position of FIG. 8 in response to depression of a 1 to 9 digit key 10, plungers 404, 405 will be moved from vertical alignment respectively with plunger 406 and pin 402*a*, and plunger 407 and pin 403*a*. Subsequent depression of zero key 20, therefore, will not operate finger 401 but pin carriage 19 will be shifted in response to this depression with the simultaneous shifting of rack 201.

Rack 202 which carries plunger 207 for the product decimal printing operation is adjusted step by step, against the tension of a spring 222, simultaneously with rack 201 during adjustment for printing of the multiplicand decimal. After the printing of the multiplicand, rack 201 will be restored but rack 202 will remain in adjusted position. Upon entry of the multiplier, rack 201 is stepped for location of the multiplier decimal and again rack 202 is stepped simultaneously therewith. Thus rack 202 will be stepped the sum of the number of steps of rack 201 to locate plunger 207 for printing the product decimal.

A normally disengaged coupling pawl 219 (FIGS. 8, 9) mounted at the right end of rack 202 is adapted to engage teeth 220 at the upper edge of rack 201 thereby coupling rack 202 for left shifting movement with rack 201. A normally disengaged holding pawl 224 mounted on a fixed bracket is adapted to engage teeth 223 of rack 202 thereby holding said rack against return movement by spring 222 upon return of rack 201 as later described.

Pawls 219, 224 are normally held in raised disengaged position (FIG. 8) by a bail 234 which underlies a rearwardly extending lug of pawl 224 and which has an arm 234*a* at its right end which underlies a rearwardly extending lug of pawl 219. Bail 234 is normally held in raised position, against the tension of a light spring to hold pawls 219, 224 disengaged, by a rocker 231 which has an arm 231*a* underlying the right end of bail 234.

Rocker 231 extends forwardly from bail 234 and is pivotally mounted on its front end on a slide 230 which is normally to the rear (FIGS. 8, 9). Rocker 231 is biased counterclockwise by a light spring and has a rightward extension which terminates in a downwardly inclined cam end 231*b*. At the right end of rack 201 is a forwardly extending lug 201*a* adapted to engage end 231*b* of rocker 231. When rack 201 is in normal right end position, lug 201*a* engages end 231*b* thereby holding rocker 231 in clockwise position (FIG. 8). Arm 231*a*, therefore, will be raised thereby holding bail 234 in counterclockwise position and this will hold pawls 219, 224 in raised disengaged position.

Lug 201*a* engages end 231*b* just sufficiently to hold pawls 219, 224 disengaged. Therefore immediately in the first step of movement of rack 201, lug 201*a* will disengage end 231*b* and permit rocker 231 to be rocked counterclockwise. This will permit bail 234 to be rocked clockwise and pawls 219, 224 to engage racks 201, 202 respectively. As a result, pawl 219 will be effective to move rack 202 each step of movement with rack 201.

Depression of multiplicand key 41, as described before, will initiate a printing and multiplicand entering machine cycle. Type wheels 301 are adjusted in accordance with the settings of pin carriage 19 during the first half of the cycle and substantially at mid-cycle hammers 304 are fired to effect the printing operation. During the last half of the cycle, pin carriage 19 is restored to its normal right end position. These printing operations are conventional and well known in the art. As pin carriage 19 is restored to the right, rack 201 which is trained therewith and which is urged to the right by spring 221 will also be restored. The restoring movement to the right of rack 201 is permitted by the yield of coupling pawl 219, while rack 202 is restrained from such movement by holding pawl 224.

In the restoring movement of pin carriage 19 and rack 201, rack 201 will, in most instances, arrive in home position before carriage 19. This is because the carriage will have been shifted to the left from home position before the rack which is not entrained therewith until depression of decimal key 46, e.g., upon entry of a multiplicand (256.25). Therefore gear 212 must be disengaged from gear 213 when rack 201 reaches home position to permit the pin carriage to complete its homing movement. To permit disengagement of gears 212, 213 of the train connecting rack 201 to pin carriage 19, means is provided to release the latched down decimal key 46 upon depression of multiplicand key 41.

The stem of key 41 (FIGS. 9, 10) is mounted for vertical movement in upper and lower plates of the keyboard. A shaft 355 is fixed at the top of the upper key plate and extends through a vertical slot in the stem of key 41. A depending arm 65 is pivotally mounted at its upper end on shaft 355 adjacent the front of the stem of key 41. The lower end of arm 65 engages a recess in the upper edge of a leftwardly extending slide 66 which is normally spring held in rightmost position. A stud 65*a* mounted intermediate the ends of arm 65 engages a cam slot 41*a* in the stem of key 41. Therefore upon depression of key 41 cam slot 41*a* engaging stud 65*a*, will rock arm 65 clockwise and move slide 66 to the left.

Adjacent the left end of slide 66 (FIGS. 8, 9) is a cam edge 66*a* which engages the lower edge of a bail 67, and to the right of edge 66*a* is a latch shoulder 66*b*. Upon leftward movement of slide 66, cam edge 66*a* will rock bail 67 counterclockwise and will move shoulder 66*b* to the left of the lower edge of bail 67. Bail 67 will thereupon engage shoulder 66*b* to hold said bail rocked, and slide 66 and key 41 against retraction.

When bail 67 is rocked counterclockwise, its upper edge will engage the upstanding left end 140*b* of latch slide 140 of decimal key 46. Slide 140 will thereupon be moved to the left to permit decimal key 46 to be spring retracted thereby raising roller 239 from engagement with cam edge 210*a* and releasing arm 210. At this time, however, arm 210 will remain in clockwise position with gears 212, 213 engaged to hold rack 201 and plunger 208 in adjusted position for the ensuing multiplicand printing operation.

Upon right return movement of pin carriage 19, after the printing operation, rack 201 will be moved accordingly by spring 221. During the return movement of carriage 19, gears 212, 213 will remain engaged until rack 201 reaches its home position. As noted in this instance, this will occur before carriage 19 reaches home position. When rack 201 reaches home position, gear 211 will be restrained from further rotation. Gear 213, however, will continue to rotate clockwise and gear 212 engaged therewith counterclockwise by the return drive of pin carriage 19. Counterclockwise movement of gear 212 will roll said gear around stationary gear 211 in counterclockwise direction and thus rock arm 210 counterclockwise to normal. Consequently gears 212, 213 will be disengaged and pin carriage 19 will continue to right home position.

In instances when the multiplicand comprises only decimal digits, e.g. (.256), rack 201 will be restored simultaneously to home position with carriage 19. Therefore, gears 212, 213 will not be disengaged as described above and hence the necessity of the disengaging means comprising bell crank 410. Upon movement of carriage 19 to home position, spring 411 will engage and rock bell crank 410 clockwise, and this will rock arm 210 counterclockwise to disengage the train between carriage 19 and rack 201.

Upon movement of rack 201 to home position, means is provided to prevent lug 201*a* from engaging arm end 231*b* of rocker 231. Otherwise rocker 231 and bail 234 would be raised, and this would release holding pawl 224. As a result, rack 202 and plunger 207 for the product printing would be restored. Slide 230, to which rocker 231 is connected, has a slot at its front end which is engaged by one arm of a bell crank 226. The other arm of crank 226 is connected to the right end of a leftwardly extending link 227. The left end of link 227 has crank connection with a forwardly extending bail 225. Normally link 227 is spring held to the right. Thus bail 225 will be held clockwise, crank 226 counterclockwise, and link 230 and rocker 231 to the rear.

A lug 66*c* at the lower edge of slide 66 engages the right edge of bail 225. Consequently, upon leftward movement of slide 66 upon depression of multiplicand key 41, lug 66*c* will rock bail 225 counterclockwise. This will move rocker 231, entrained therewith, forwardly to remove end 231*b* from the path of movement of lug 201*a* of rack 201.

Multiplicand key 41 is released upon operation of a push arm 356. Arm 356 has a cam edge at its left upper end which engages the underside of a roller 67*a* on the rear arm of bail 67. Near the end of the multiplicand entering cycle, after pin carriage 19 and rack 201 have been restored, arm 356 will be moved toward the left. Upon leftward movement of arm 356, its cam edge engaging roller 67*a*, will raise bail 67 thereby releasing slide 66. Slide 66 will thereupon be restored to the right thereby rocking arm 65 counterclockwise to raise key 41 by movement of stud 65*a* to the bottom of inclined slot 41*a* of the key stem.

Furthermore when slide 66 is restored, lug 66*c* will release bail 225. Link 227 will therefore be moved to the right and rocker 231 entrained therewith will be moved rearwardly toward normal position. However, at this time, rack 201 will have been restored and therefore lug 201*a* will be in the path of rearward movement of end 231*b* of rocker 231. Consequently the rear edge of end 231*b* will engage the front edge of lug 201*a* and rocker 231 will not be raised to disengage pawls 219, 224. As a result, product rack 202 will be held in the position to which it has been adjusted upon entry of the multiplicand.

Arm 356 may be operated in correct timed relation with the printing cycle, for example, by an appropriate linkage from cam cluster 345 or from cam or lever means operated from any conveniently located cyclically driven machine member.

After printing and entry of the multiplicand, and multiplier will be entered in pin carriage 19 with depression of decimal key 46 in proper sequence in the same manner as described for entry of the multiplicand. Rack 201 and plunger 208 therefore will be correctly adjusted for decimal printing in conjunction with printing of the multiplier.

During adjustment of rack 201 for the multiplier, product rack 202 will be adjusted an equal number of steps by coupling pawl 219. This adjustment will be added to the adjustment previously made during multiplicand entry. Rack 202 and plunger 207 therefore will be correctly adjusted for the product decimal printing.

The machine is cycled upon depression of multiplier key 43 as described in connection with multiplicand key 41. The multiplier will therefore be printed below the multiplicand.

Multiplier key 43 has, operationally associated therewith, an arm 65 and slide 66 which are duplicates functionally of the corresponding parts described in connection with multiplicand key 41. Therefore the same operations described in connection with the operation of these parts upon depression of multiplicand key 41 will be duplicated upon depression of multiplier key 43. Near the end of the cycle key 43 will be released as described in connection with key 41.

Depression of a total key 44 will initiate a total taking operation from accumulator wheels 1 to print the product and decimal. Total key 44 has, operationally associated therewith an arm 65 and slide 66 which duplicate the functions of the corresponding parts described in connection with multiplicand and multiplier keys 41, 43. Therefore the same operations described in connection with the operation of these parts upon depression of multiplicand and multiplier keys 41, 43 will be duplicated upon depression of total key 44. Near the end of the total taking cycle, key 44 will be released as described for keys 41, 43.

The slide 66 which is associated with total key 44 controls an additional operation not controlled by slides 66 respectively of keys 41 and 43. It will be recalled that after the factor entering operations, the rear edge of end 231*b* of rocker 231 will abut the front edge of lug 201*a* of restored rack 201. Pawls 219, 224 therefore will remain engaged respectively with racks 201, 202. As a result, product rack 202 will be held in adjusted position. Means controlled by the slide 66 associated with total key 44 is operable to release pawls 219, 224 so that rack 202 may be restored by its spring 222.

Slide 66 has a right extension 66' which is connected with the front of a rearwardly extending lever 412. The rear end of lever 412 has slot and pin connection with a transverse slide 413. Mounted on slide 413 is a click pawl 414 which is biased clockwise by a light spring to vertical position and which is yieldable counterclockwise. The upper left edge of pawl 414 comprises a cam edge, and normally its right edge is immediately adjacent the left face of the forwardly extending arm of rocker 231.

Upon leftward movement of slide 66, in response to depression of total key 44, lever 412 will be rocked clockwise and thereby move slide 413 and pawl 414 to the left. The right edge of pawl 414 therefore will engage the arm of rocker 231, yield counterclockwise and pass to the other side of said arm. Pawl 414 will then be spring restored to vertical position.

When slide 66 is restored at the end of the total taking operation, pawl 414 will be restored to the left side of the arm of rocker 231. In this movement of pawl 414, its cam edge will engage the lower edge of the arm of rocker 231 thereby raising said rocker. This will release pawls 219, 224 and product rack 202 will be restored by spring 222. Furthermore when rocker 231 is raised, its end 231*b* will be raised above lug 201*a* of rack 201. Therefore, rocker 231 will be moved to the rear with its end 231*b* passing above lug 201*a*. After pawl 414 disengages rocker 231, said rocker will move downwardly with end 231*b* resting in its normal position (FIGS. 8, 9) on the top edge of lug 201*a*.

In application Serial #542,967, dividend entering key 13 and divisor entering key 14 are described in connection with control of mechanism concerned with quotient decimal printing. In that application means is not disclosed for printing the decimal with the dividend and divisor. Keys 13 and 14 however are disclosed each as operating an arm 65 and slide 66 in association with common bail 66. It will be apparent, therefore, that rack 201 and plunger 208 may be adjusted for dividend and divisor decimal printing substantially as herein disclosed for multiplicand and multiplier decimal printing.

I claim:

1. In a calculating machine, the combination with means for entering a factor into said machine including digital value keys adapted for depression successively in accordance with the corresponding ordinally successive digital values respectively of said factor, and printing mechanism including an ordinal series of differentially settable digital type members operable to print said entered digits in the corresponding ordinal positions; of decimal type mechanism ordinally adjustable for operation successively with respect to the orders of said digital type members, shift means operable to effect an ordinal step of adjustment of said decimal type mechanism in a given direction in response to depression of each of said digital value keys and adjustable to a disabled position, and means for controlling the adjustment of said shift means including a decimal key adapted for depression in proper decimal sequence upon successive depression of said digital value keys.

2. The invention according to claim 1; wherein said shift means for said decimal type mechanism is normally disabled and is adjustable to enabled position in response to depression of said decimal key.

3. In a calculating machine, the combination with means for entering a factor into said machine including digital value keys adapted for depression successively in accordance with the corresponding ordinally successive digital values respectively of said factor, a pin carriage shiftable an ordinal step of movement from a home position in a given direction in response to each key depression and settable in accordance with the digital value of each depressed key, and printing mechanism including an ordinal series of differentially settable digital type members operable to print the digits corresponding to the settings of said pin carriage and in corresponding ordinal relation; of decimal type mechanism ordinally adjustable from a home position for operation successively with respect to the orders of said digital type members, a drive train operable upon each ordinal step of said pin carriage to effect an ordinal step of adjustment of said decimal type mechanism and adjustable to a disabled position, and means for controlling the adjustment of said drive train including a decimal key adapted for depression in proper decimal sequence upon successive depression of said digital value keys.

4. The invention according to claim 3; wherein said drive train for said decimal type mechanism is normally disabled and is adjustable to enabled position in response to depression of said decimal key.

5. In a calculating machine, the combination with means for entering a factor into said machine including digital value keys adapted for depression successively in accordance with the corresponding ordinally successive digital values respectively of said factor from higher to lower orders, and printing mechanism including an ordinal series of differentially settable digital type members operable to print said entered digits in the corresponding ordinal positions; of decimal type mechanism ordinally adjustable for operation successively with respect to the successive higher orders of said digital type members, normally disabled shift means operable to effect an ordinal step of adjustment of said decimal type mechanism in response to depression of each of said digital value keys, and a decimal key adapted for depression in proper decimal sequence upon successive depression of said digital value keys and operable to enable said shift means.

6. In a calculating machine, the combination with means for entering a first and a second factor into said machine including digital value keys adapted for depression successively in accordance with the corresponding ordinally successive digital values respectively of each factor from higher to lower orders, an accumulator register including an ordinal series of accumulator units, means for performing a calculation involving said factors and for registering the result in said accumulator, and printing mechanism including an ordinal series of differentially settable digital type members operable to print the digits of said result in the ordinal positions corresponding to the registered positions; of decimal type mechanism ordinally adjustable for operation successively with respect to the successive higher orders of said digital type members, normally disabled shift means operable to effect an ordinal step of adjustment of said decimal type mechanism in response to depression of each of said digital value keys, a decimal key adapted for depression in proper decimal sequence upon successive depression of said digital value keys and operable to enable said shift means, and means operable subsequent to entry of said first factor to disable said shift means.

7. In a caluculating machine, the combination with means for entering a first and a second factor into said machine including digital value keys adapted for depression successively in accordance with the corresponding ordinally successive digital values respectively of each factor from higher to lower orders, an accumulator register including an ordinal series of accumulator units, means for performing a calculation involving said factors and for registering the result in said accumulator, and printing mechanism including an ordinal series of differentially settable digital type members operable to print the entered digits of each factor in the corresponding ordinal positions and to print the digits of said result in the ordinal positions corresponding to the registered positions; a normally disabled decimal type mechanism operable with each order of said digital type members; a first normally disabled shift means successively adjustable to enable the successive higher order decimal mechanism respectively for operation upon printing of the digits of each of said factors, a second shift means successively adjustable upon adjustment of said first shift means to enable the successive higher order decimal mechanism respectively for operation upon printing of said result, a decimal key adapted for depression in proper decimal sequence upon successive depression of said digital value keys and operable to enable said first shift means, and means operable subsequent to entry of said first factor to disable and to restore said first shift means.

References Cited in the file of this patent

UNITED STATES PATENTS

| | | |
|---|---|---|
| 1,371,138 | Bair | Mar. 8, 1921 |
| 2,768,786 | Reppert | Oct. 30, 1956 |

FOREIGN PATENTS

| | | |
|---|---|---|
| 1,008,510 | Germany | May 16, 1957 |

UNITED STATES PATENT OFFICE

CERTIFICATE OF CORRECTION

Patent No. 2,987,246 June 6, 1961

Heinrich Wagemann

It is hereby certified that error appears in the above numbered patent requiring correction and that the said Letters Patent should read as corrected below.

Column 3, line 37, for "ot" read -- to --; column 4, line 47, after "19" insert -- is --; column 5, line 13, for "portion" read -- position --; line 69, for "325" read -- 326 --; column 6, line 15, for "rockedd" read -- rocked --; column 9, line 11, strike out "a"; column 10, line 20, for "hamer" read -- hammer --; column 12, line 54, for "on", first occurrence, read -- at --; column 14, line 58, for "and", second occurrence, read -- the --; column 17, line 13, for "caluculating" read -- calculating --; column 18, line 4, for "members;" read -- members, --.

Signed and sealed this 8th day of January 1963.

(SEAL)
Attest:

ERNEST W. SWIDER
Attesting Officer

DAVID L. LADD
Commissioner of Patents